United States Patent
Soon-Shiong et al.

(10) Patent No.: US 10,346,753 B2
(45) Date of Patent: Jul. 9, 2019

(54) INTENT ENGINES, SYSTEMS AND METHOD

(71) Applicant: Nant Holdings IP, LLC, Culver City, CA (US)

(72) Inventors: Patrick Soon-Shiong, Los Angeles, CA (US); Luke Soon-Shiong, Los Angeles, CA (US)

(73) Assignee: Nant Holdings IP, LLC, Culver City, CA (US)

(*) Notice: Subject to any disclaimer, the term of this patent is extended or adjusted under 35 U.S.C. 154(b) by 487 days.

(21) Appl. No.: 14/525,587

(22) Filed: Oct. 28, 2014

(65) Prior Publication Data

US 2015/0120641 A1   Apr. 30, 2015

Related U.S. Application Data

(60) Provisional application No. 61/896,454, filed on Oct. 28, 2013.

(51) Int. Cl.
*G06N 5/04* (2006.01)
*G06Q 30/02* (2012.01)

(52) U.S. Cl.
CPC ............. *G06N 5/04* (2013.01); *G06Q 30/02* (2013.01)

(58) Field of Classification Search
None
See application file for complete search history.

(56) References Cited

U.S. PATENT DOCUMENTS

| | | |
|---|---|---|
| 6,711,293 B1 | 3/2004 | Lowe |
| 7,949,672 B2 | 5/2011 | Zhang et al. |
| 8,326,630 B2 | 12/2012 | Chandrasekar et al. |
| 8,462,996 B2 | 6/2013 | Moon et al. |
| 8,515,136 B2 | 8/2013 | Mori et al. |
| 2002/0156866 A1 | 10/2002 | Schneider |
| 2006/0064411 A1 | 3/2006 | Gross et al. |
| 2006/0277474 A1 | 12/2006 | Robarts et al. |

(Continued)

FOREIGN PATENT DOCUMENTS

| | | |
|---|---|---|
| EP | 1643390 A1 | 4/2006 |
| JP | 2001087559 A | 4/2001 |

(Continued)

OTHER PUBLICATIONS

Brahler, Analysis of the Android Architecture, Universitat des Landes Baden-Wurttemberg, 2010, pp. 52.*

(Continued)

*Primary Examiner* — Wilbert L Starks
(74) *Attorney, Agent, or Firm* — Mauriel Kapouytian Woods LLP; Lawrence Gabuzda; Andrew Noble

(57) ABSTRACT

A system and method to accurately modify the function of a user's electronic device in response to the multiple aspects making up a user's evolving state of mind are presented. Persistent intent objects are generated to represent a user's state of mind and the relative importance of a particular state of mind to a user's instant attention. The intent objects can be related to situations or environments and could exist beyond any specific situations or environments. The collective effect of the intent objects can be used to customize the functions of a user device to match the user's state of mind extending beyond inferences drawn from an individual or instant set of circumstances.

39 Claims, 4 Drawing Sheets

(56) References Cited

U.S. PATENT DOCUMENTS

| | | |
|---|---|---|
| 2007/0276729 A1 | 11/2007 | Freer |
| 2008/0126284 A1 | 5/2008 | Forbes et al. |
| 2009/0049032 A1 | 2/2009 | Maghoul et al. |
| 2009/0228439 A1 | 9/2009 | Manolescu et al. |
| 2010/0141663 A1 | 6/2010 | Becker et al. |
| 2010/0205180 A1 | 8/2010 | Cooper et al. |
| 2011/0098029 A1 | 4/2011 | Rhoads et al. |
| 2011/0313954 A1 | 12/2011 | Zhao et al. |
| 2012/0072936 A1 | 3/2012 | Small et al. |
| 2012/0130969 A1 | 5/2012 | Wong et al. |
| 2012/0165046 A1 | 6/2012 | Rhoads et al. |
| 2012/0290432 A1 | 11/2012 | Tedjamulia et al. |
| 2013/0018954 A1 | 1/2013 | Cheng |
| 2013/0031081 A1 | 1/2013 | Vijayaraghavan et al. |
| 2013/0194406 A1 | 8/2013 | Liu et al. |
| 2013/0204813 A1 | 8/2013 | Master et al. |
| 2013/0243392 A1 | 9/2013 | Vasudevan et al. |
| 2015/0143404 A1 | 5/2015 | Byers |
| 2015/0199730 A1 | 7/2015 | Soon-Shiong |

FOREIGN PATENT DOCUMENTS

| | | |
|---|---|---|
| WO | 03/041000 A1 | 5/2003 |
| WO | 2008134901 A1 | 11/2008 |
| WO | 2011-000046 A1 | 1/2011 |
| WO | 2012-064530 A1 | 5/2012 |

OTHER PUBLICATIONS

Cartright, et al., Intentions and Attention in Exploratory Health Search, SIGIR'11, 2011, pp. 65-74.*

Marache-Francisco, et al., Process of Gamification, The Sixth International Conference on Advances in Human-oriented and Personalized Mechanisms, Technologies, and Services, 2013, pp. 126-131.*

Goel, et al., Predicting consumer behavior with Web search, PNAS, vol. 107, No. 41, 2010, pp. 17486-17490.*

Narayanan., et al., Multimodal Systems for Children: Building a Prototype, Sixth European Conference on Speech Communication and Technology, EUROSPEECH 1999, 1999, pp. 1-4.*

Georgiadis, Adaptation and Personalization of User Interface and Content, chaps 18-38, 2006, pp. 266-598 (Year: 2006).*

ISA/KR, "International Search Report and Written Opinion," International Patent Appln No. PCT/US2014/062575, 12 pages.

Lorenz, Nancy, 25 Essential Expressions Challenge, exercise sheet, 2007, 1 page.

AFP, Affectiva technology taps into people's emotions, Technology/Hi Tech & Innovation, Apr. 1, 2011, pp. 1-2, PhysOrg,com, http://physorg.com/news/2011-04-affectiva-technology-people-emotions.html.

Tel Aviv University, Programming regret for Google: Scientists give computers 'hindsight' to anticipate the future, Technology / Computer Sciences, Apr. 13, 2011, pp. 1-2, PhysOrg.com, http://www.physorg.com/news/2011-04-google-scientists-hindsight-future.html.

Princeton University, Searching the brain for social networks, Medicine / Phsychology & Psychiatry, Apr. 5, 2011, pp. 1-3, PhysOrg.com, http://www.physorg.com/news/2011-4-brain-social-networks.html.

RoboEarth, What is RoboEarth?, downloaded Jun. 6, 2013, pp. 1-2, www.roboeath.org/what-is-roboearth.

Wikipedia, Affective computing, Wikipedia, the free encyclopedia, May 22, 2013, pp. 1-12, enwikipedia.org/wiki/Affective_computing.

Vinodhini, G., et al., Sentiment Analysis and Opinion Mining: A Survey, International Journal of Advanced Research in Computer Science and Software Engineering, Jun. 2012, pp. 282-292, vol. 2—Iss. 6, www.ijarcsse.com.

International Search Report and Written Opinion dated Apr. 27, 2015 for International Patent Application No. PCT/US2015/011266, 12 pages.

International Preliminary Report on Patentability dated Apr. 15, 2016 for International Patent Application No. PCT/US2015/011266, 4 pages.

Extended European Search Report, European Patent Application No. 14856964.3, dated Mar. 16, 2017, 7 pages.

Office Action issued in Australian Patent Application No. 2014342551 dated Dec. 2, 2016.

Examination Report No. 1, Australian Application No. 2017251780, dated Nov. 12, 2018, 2 pages.

* cited by examiner

Intent Object 105

Attributes 210 (may have weighing or adjustment factors):
- Relevancy
- User attributes
- Triggering event attributes
- Demographic attributes
- Goal attributes
- Privacy attributes
- Priority attributes
- Location attributes
- Historical attributes
- Importance attributes
- Permanence attributes
- Etc.

Rules 220:
- Attribute modification rules
- Attribute priority rules
- Etc.

Figure 2

INTENT ENGINES, SYSTEMS AND METHOD

This application claims priority to U.S. Provisional Application No. 61/896,454 filed Oct. 28, 2013. U.S. Provisional Application No. 61/896,454 is incorporated by reference in its entirety.

FIELD OF THE INVENTION

The field of the invention is adjusting the functionality of a user's device based an assessment of a user's state of mind.

BACKGROUND

The background description includes information that may be useful in understanding the present invention. It is not an admission that any of the information provided herein is prior art or relevant to the presently claimed invention, or that any publication specifically or implicitly referenced is prior art.

The evolution of portable computing and communication technologies has enabled users to access information nearly anywhere, almost instantly. Versatile, data-enabled smart phones or other portable computing devices have become increasingly common. This has in turn triggered the development of services accessible through the portable devices designed to assist a user in a variety of situations that the user might encounter. Often times, these services attempt to predict what a user wants or needs in a given situation to provide the relevant service in the fastest, most relevant, most customized way possible. Unfortunately, these predictions of a user's intent are based only on information that is related to the service being delivered. Additionally, the predictions themselves are limited, and are typically only useful for specific purposes, events, queries, situations or desired outcomes. As such, the predictions often fail to accurately account for all of the factors that can influence a person's intent, and fail to represent a person's mindset at a particular point in time and, as a result, ultimately fail to accurately predict what a particular user really wants or needs. Further such predications fail to address a persistent nature of intent.

Others have put forth effort toward developing systems and methods for determining intent at minor levels.

For example, U.S. patent application 2010/0205180 A1 to Cooper, et al ("Cooper") titled "Method and Apparatus for Identifying and Classifying Query Intent," published Aug. 10, 2010, discusses an intent management tool for identifying intent categories used in searching. The intent categories are then used with specific one-time search queries to generate search query results. Cooper does not discuss having a persistent, adaptable intent object representing a user's intent beyond a single query or result.

U.S. patent application 2013/0006777 A1 to Krishnareddy, et al ("Krishnareddy") titled "Determination and Monetization of Future Location," published Jan. 3, 2013, discusses calculating a probability that a user will be at a particular location based on past and current locations or user-indicated future locations and charging advertising costs based on the probabilities. Krishnareddy does not discuss location-independent intent or a user's intent temporally extended beyond events or locations.

U.S. patent application 2011/0098029 A1 to Rhoads, et al ("Rhoads") titled "Sensor-Based Mobile Search, Related Methods and Systems," published Apr. 28, 2011, discusses using the sensor data gathered by a device and a person's past actions to predict a person's current intent. The intent discussed in Rhoads is calculated only at a time it is necessary to obtain a result related to the predicted intent. Rhoads does not discuss persistent intent objects, existing beyond a particular situation or purpose, or an intent object calculated based on situations that are not related to a purpose or outcome. Rhoads also fails to discuss having intent objects affect other intent objects.

U.S. patent application 2006/0064411 A1 to Gross, et al ("Gross") titled "Search Engine Using User Intent," published Mar. 23, 2006, discusses inferring the intent of a user based on prior search behavior. In Gross, the intent is used to properly respond to a user's search query. Gross further discusses that the past user information used to help determine intent is information directly related to the submitted query. Gross does not discuss a persistent intent object lasting beyond, or intent objects that can arise, exist or be used beyond and outside of a goal or purpose. Gross also fails to discuss intent objects that can interact with other intent objects.

These prior attempts also use immediate factors in determining context, and thereby determining intent as a predictor. None of the prior attempts allow for the adjustment based on unrelated or unavailable factors, or for an interrelationship of a plurality of persistent intent objects that can influence the determination of an instant intent.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for systems and method of ascertaining a user's intent in a way that accurately reflects a real person's constantly evolving state of mind.

SUMMARY OF THE INVENTION

The inventive subject matter provides apparatus, systems and methods in which a user's persistent, evolving intent can be ascertained and represented by generating a persistent intent object. The system includes at least one non-transitory computer-readable non-transitory memory (e.g., RAM, flash, ROM, hard drive, solid state drive, etc.), at least one processor coupled with that memory, and at least communication interface configured to communicatively couple components within the system with each other and with other devices, systems etc.

The system's non-transitory computer-readable memory can store instructions that, when executed by one or more processors within the system, carry out the functions of the invention. The non-transitory computer-readable memory can also store data related to the functions of the invention. This data can be stored in the form of data entries (e.g., records, objects, etc.) in corresponding databases.

The system can comprise an intent management engine that can create and modify intent objects related to a user. The intent objects can represent a user's state of mind. As a user's state of mind can change, evolve, affect a user's interpretation and perspective of their experiences and environment, and affect the user's decision-making, so can an intent object evolve to account for these changes and evolutions.

An intent object can be created and modified independent of events, environments or situations, or the context attributed to those events, environments or situations.

An intent object can be created and modified based on particular events, environments or situations, or the context attributed to events, environments or situations.

An intent object can affect or modify the context attributed to events, environments or situations. The intent object can affect or modify the criteria used to relate context to intent and vice-versa.

An intent object can be goal-oriented or non-goal oriented. A non-goal oriented intent object can be used to simply represent a current state of mind, not influenced or directed by any indication or probability of a user's specific future actions or future possible events, environments or situations. Non-goal oriented intent objects can still represent a state of mind that can have an influence on actions generally, such as a user's general behavior or a preponderance to make general decisions in a particular way.

The use of persistent intent objects allows for the incorporation of factors not immediately available or otherwise unrelated to an immediate situation, event or environment in predicting user behavior.

The system can also comprise an engine, such as the intent management engine or a separate engine, that can create and modify thought objects related to a user. The thought objects can represent a product a user's mental process. As a person's thoughts about a particular stimulus, object, topic, subject, etc. changes, so can the thought object evolve to reflect these changes.

Thought objects can have associations with other thought objects, representing links between thoughts in a person's mind and can be used to establish communication links between different people via associations of the thought objects of different people.

Thought objects corresponding to multiple people can be used to establish social networks around the subject of the thought object, between those people.

Thought objects about a particular subject (e.g., a particular real-world object) can be collected over time and used to give rise to an independent thought object of the subject itself.

The system can be configured to use a combination of thought objects and intent objects, such as to represent the totality of a person's personality and consciousness.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 2 is an example of an intent object used to carry out aspects of the inventive subject matter.

DETAILED DESCRIPTION

Figure 1:
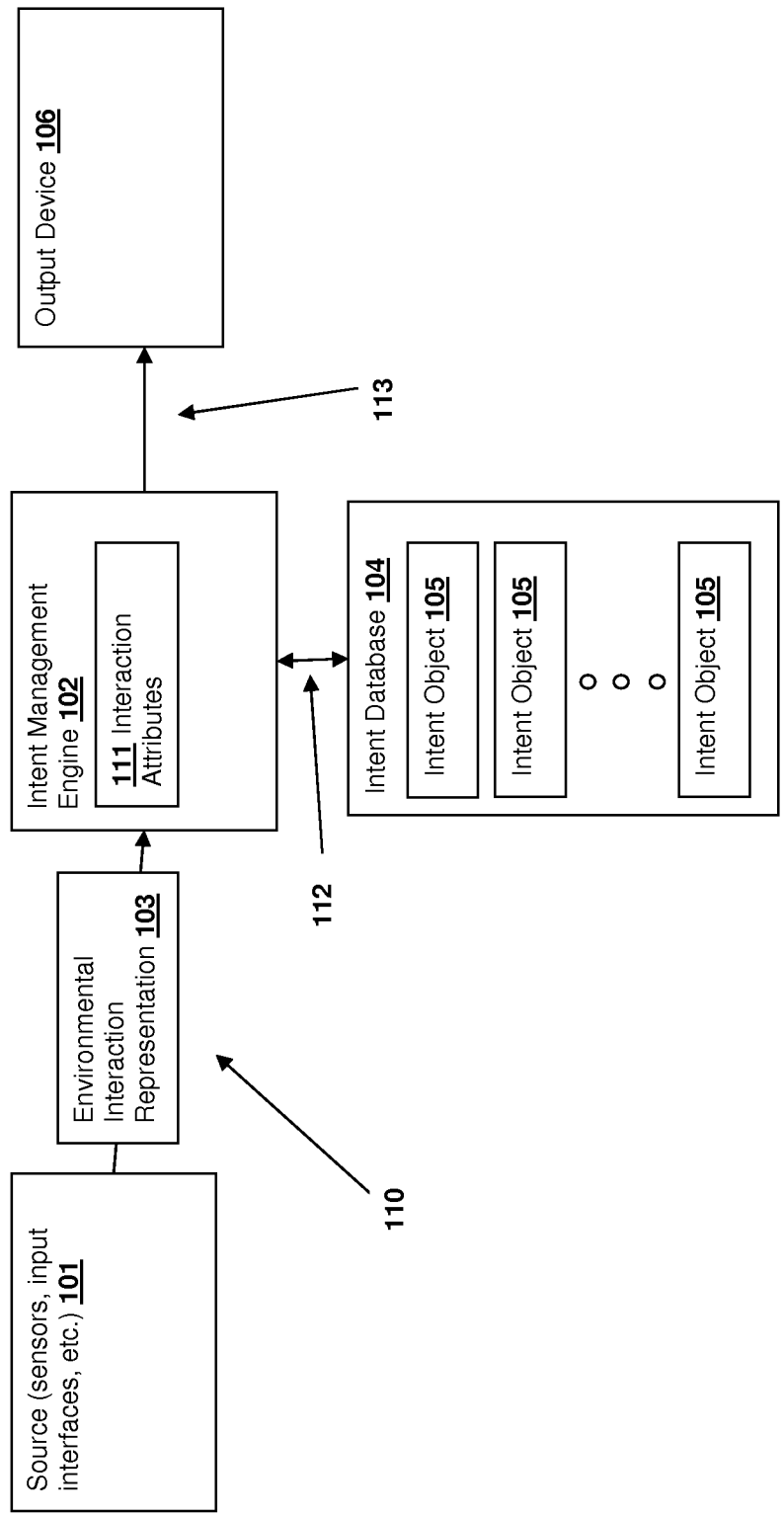
FIG. 1 is an overview of a sample implementation of a method to carry out the inventive subject matter.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including reducing the load on individual computing elements and the collective network by eliminating the need to constantly re-calculate or recreate every possible representation of a user's state of mind in order to adequately respond to the user's state of mind.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The focus of the disclosed inventive subject matter is to enable construction of or configuration of a computing device to operate on vast quantities of digital data, beyond the capabilities of a human. Although the digital data represents a consumer's or other user's intent it should be appreciated that the digital data is a representation of one or more digital models of intent, not that actual intent itself. By instantiation of such digital models or digital objects in the memory of the computing devices, the computing devices are able to manage the digital data or models in a manner that could provide utility to a user of the computing device that the user would lack without such a tool.

A user can interact with the system of the invention via an electronic device, and the electronic device can be a computing device. Examples of computing devices can include a desktop computer, a laptop computer, a cellular telephone, phablets, a PDA, a tablet, a personal music player, a video game console, or any other device having hardware capable of processing instructions. The computing device can include a storage memory (e.g., a hard drive, a solid-state drive, RAM, ROM, flash, etc.) communicatively coupled to one or more processors. The storage memory can store instructions and data used by the processor to execute aspects of the inventive subject matter.

The computing device can include sensors capable of sensing one or more aspects of the device's environment. The computing device can further include hardware that enables the sensor to provide data associated with the sensed environment to hardware or software modules for use in processing functions.

Sensors can include a camera, a microphone, a thermometer, a global positioning system (GPS) sensor, a mechanical sensor, a chemical sensor, a biometric sensor, a hall effect sensor, an accelerometer, a pressure sensor, a compass, a magnetometer, a gas sensor, a speed sensor, a breathalyzer, an electrochemical sensor, EKG, EEG, a touch display, an optical sensor, a proximity sensor, a vibration sensor, a piezoelectric sensor, a capacitive sensor, a resistive sensor, a current sensor, a magnetometer, a voltage sensor, a liquid sensor, a weight sensor, or other sensors. In some embodiments sensors can be external to the computing device where the external sensor's data can be accessed over a sensor interface (e.g., serial interface, wireless interface, etc.).

The computing device can include input interfaces that allow for a user to interact with the system by inputting data. Input interfaces can include a touch screen, a keyboard, a controller, a joystick, a track ball, a mouse, a light pen, a graphic tablet, a barcode reader, a gamepad, a paddle, an electronic white board, a midi instrument, a video capture device, a remote, a wand, a stylus, a glove, a motion detector, a scanner, or other input interfaces.

The device can include output interfaces that can provide information back to a user. Output interfaces can include display screens, speakers, sensory feedback mechanisms, tactile output, or other outputs.

The computing device can include one or more communication interfaces that enable the device to exchange data with other computing devices. The communication interfaces can include wired or wireless interfaces and short range or long range interfaces. Wired interfaces can include interfaces such as Ethernet, USB, HDMI, RS-232, or even proprietary interfaces. Wireless interfaces can include interfaces such as WiGIG, wireless USB, UWB, Wi-Fi, cellular Bluetooth®, Zigbee®, IrDA, or other wireless interfaces.

FIG. 1 provides an example of a data flow outlining how environmental interaction give rise to intent objects that can dictate functionality of a user's device. The following discussion relates to intent objects, which can be considered a digital representation or digital model of a person's intent with respect to an environment or circumstances as determined from interaction attributes. Intent objects are data objects instantiated with attributes or rules that govern the behavior of the intent objects with respect to each other or the user's device. Within the scope of following discussion, an intent object embodies a "purpose" associated with the user's interactions. The purpose of a user's interactions should not be confused with a goal although a goal could contribute to the purpose. Such intent objects can be instantiated from classes having data members that are populated upon instantiation, via sensor data, or other techniques.

For further clarity with respect to intent, consider an example where a person is shopping for a gift. The goal of the activity is to purchase a gift, perhaps a specific kind of gift. However, the intent of the person could be very different from the goal. Perhaps the intent of the person is to make a child happy on their birthday. Alternatively, the intent of the person might relate to being funny or sarcastic by purchasing a joke gift. Each of these intents can be modeled or represented by intent objects 105.

As illustrated in FIG. 1, an intent management engine 102 obtains an environmental interaction representation 103 from a source 101 at step 110. The environmental interaction representation 103 can be considered to be data associated with or related to one or more aspects of the environment of a user's electronic device.

The environmental interaction representation 103 can be generated by source 101. The source 101 can be a sensor internal or external to a user's electronic device, an input interface available to the user or a combination of a sensor and an input interface, wherein the environmental interaction representation 103 can include a combination of data from both types of sources 101.

For a sensor functioning as a source 101, the environmental interaction representation 103 can be a collection sensor data representing a condition or aspect of the environment detected by the sensor. In the camera example, the environmental interaction representation 103 can be image data or video data representing an aspect of the environment visible to the camera. In other examples, environmental interaction representation 103 can include one or more of position data (from a GPS or other position sensor), movement data (e.g., accelerometer data, motion sensor data, data extrapolated from position data, etc.), temperature data (from a temperature sensor), ambient light data, pressure data (from a pressure sensor), user physiological data (e.g., heartbeat data, blood pressure data, body temperature data, blood-alcohol level data, glucose level data, and other data from suitable biometric sensors), sound data (e.g., detected sounds or noises, volume of ambient noise, etc. as detected via a microphone or other audio sensor), olfactometer data, etc.

For an input interface as a source 101, the environmental interaction representation 103 can be information obtained via the input interface. The environmental interaction representation 103 can be an instant input, such as the inputs to a mobile phone at the current location of a user. The environmental interaction representation 103 can also include past inputs, such as prior searching activity on a search engine, prior calendar entries on a calendar program, prior meetings or events scheduled via a scheduling program, prior activity on an internet browser, prior messages (e.g., email, text, etc.) sent to or received from others, prior activity on a social networking site, prior user preferences corresponding to one or more devices or services the user currently uses or has used in the past, etc.

The environmental interaction representation 103 can include metadata about the source 101. The metadata can be information about the source 101 such as configuration or system information about the source 101. If a source 101 is a camera on a smart phone, for example, the metadata can include information about the camera itself such as resolution, zoom level, and also information about the smart phone such as processing and memory capacity, available user input or output interfaces, available communication interfaces, etc. Additional examples of metadata including user identification, GPS location, context information, proximity information, or other information that can be attached to the digital representation of the environment.

In an illustrative example, a user captures an image inside a shopping mall with a camera on a smartphone also having a GPS interface, data exchange capabilities, and a touch-screen input/output. At step 110, the intent management engine 102 obtains the image along with GPS data from the phone, as well as the characteristics of the phone itself (or based on a configuration identifier, the intent management engine 102 can obtain the phone's capabilities from a reference database, including the user's current settings such as using a hash or other signature from a current setting data listing). Also for this example, the user enters the search term "where to buy video game console" into a search engine on the phone.

At step 111, the intent management engine 102 derives interaction attributes within an interaction space based on the environmental interaction representation 103.

The interaction space can be a construct defining the scope of the interactions available for a particular environment represented by the environmental interaction representation 103. In other words, the interaction space can define the nature of the interactions, and can provide a boundary as to what the possible available interactions could take place. Interactions can be considered generally to be the possible modifications or effects to intent objects based on the available inputs and outputs and also the possible output actions on a user's device in response to those changes to the intent objects. Thus, the interaction space can be a data construct bounded by the types of sensors and interfaces available to the system for input and output functions. For example, a mobile device could have a camera, microphone, touchscreen input, audio output interface (e.g., speakers or headphone-out), GPS navigation interface, cellular communication capability, fingerprint sensor, accelerometer, sensory feedback interfaces (e.g., a vibration mechanism), and temperature sensor. Some or all of these input and output interfaces can define the current interaction space for the device. Where all of these features are active, the interaction space is defined by all of the features. Thus, available interactions are those that can use one or more of these features. In some instances, some of these features of the mobile device might not be accessible in a particular environment (e.g., a phone set to "silent mode", a mobile device in an area having poor or even no cellular coverage or reception, etc.). In these instances, the interaction space includes only those features that are available. In other words, the interaction space is limited to interactions that do not require or rely on the unavailable features to function. In the "silent mode" example, the interactions can be limited to those that do not require audio output. In the example of the mobile device having poor or no cellular reception, the interactions can be limited to those requiring little to no data exchange with external devices or to those capable of being executed using the data and resources available to the device locally.

The interaction attributes can be characteristics of the environment represented by the environmental interaction representation 103 according to a particular interaction space. They can be the characteristics of the environment that are recognizable according to the particular interaction space. The interaction attributes can include contextual attributes assigned to the environment according to the interaction space. The interaction attributes can include a group or range of possible interactions available in the environment, determined based on the environmental interaction representation 103 and the particular interaction space. Interaction attributes can also be mapping attributes used to determine applicable intent objects 105 for a particular environment or situation based on the environmental interaction representation 103 and the particular interaction space.

Optionally, the intent management engine 102 can receive additional information based on the derived interaction attributes. For example, the additional information can include additional information related to the user, additional information related to the environment, and additional information related to the interaction space, associated with the derived attributes. This information can be obtained from a separate database, and requested by the intent management engine 102 as needed.

Continuing with the shopping mall example, at step 111, the intent management engine 102 performs image recognition on the image data and using this data and/or the GPS data and determines that the user is at the shopping mall and where in the shopping mall the user currently stands. The intent management engine 102 proceeds to retrieve associated store listings, including information about the stores in the mall, the products that they each sell, themes, etc. Potential interactions associated with stores and/or products can include advertisements, notifications of sales, information about products or stores themselves, potential navigation paths among related stores, etc. One of these stores is an ice-cream store where the user once shared an ice-cream cone with his daughter. These could be presented in various output modalities including email presentation, text message, augmented-reality overlays, video presentation, audio-only presentation, vibration or other sensory alerts for proximity, etc. The content, modalities, and phone capabilities at the instant all having corresponding attributes, the intent management engine 102 derives the interaction attributes by reducing all possible attributes to those within the potential interaction space. Thus, if certain information about the mall requires a microphone and the user has it disabled, the attributes associated with that information will not be included in an interaction space. Likewise, any attributes associated with content or device functions that have been disabled or are not part of the instant smartphone are removed from consideration. It should be noted that while attributes associated with locating a store selling the sought "video game console" entered into the search engine are included, attributes stores or products that are not results to the query are not to be excluded automatically because there can exist more than one intent object 105 associated with the shopping mall environment.

After deriving the interaction attributes, the intent management engine 102 can modify one or more intent objects 105 stored on an intent database 104 based on these derived attributes at step 112. To modify the appropriate intent object 105, the intent management engine 102 can match the derived interaction attributes with attributes of intent objects 105. Based on the rules of the intent object 105 corresponding to the derived attributes, the intent management 102 can appropriately modify or otherwise use the intent object 105.

The modification of an intent object 105 can include one or more of instantiating, removing, deleting, activating, deactivating, classifying, archiving, exporting, forwarding, importing, receiving, tagging, duplicating, selecting, and adding information to the intent object 105.

In the example of the user at the mall, at step 112 the intent management engine 102 correlates the interaction attributes of the environment (the mall and all associated information, device attributes, etc.) to those of an intent object. The intent management engine 102 can first identify potential applicable intent objects 105 by searching or matching the interaction attributes with the attributes of all existing intent objects for the user. In this example, a first matching intent object 105 is one associated with a user not liking malls in general. However, a second matching intent object is one of a "happy" state of mind, attributes of which include positive feelings associated with the user's daughter. These attributes can be linked to a past event where the user and the daughter shared an ice-cream cone at a store in the same mall. Thus the "happy" intent object is retrieved and elevated in importance because of the interaction attributes associated with the ice cream store in the mall.

The modified intent objects 105 can then be used to adjust, configure, influence or otherwise affect the function of an output device at step 113. The effect on the function of the output device can include one or more of a recommendation, an adjustment of the output functions of the device, an adjustment in the selection of content to output to the device, an adjustment of the permissions associated with functions or applications of the device, a presentation of content, a modification to an image representation of the user's current environment, a presentation of augmented reality content, a modification to an augmented reality presentation on the user's device, etc.

In the mall example, the search engine results on the phone give the user a most direct path to the store to buy the video game console. However, due to the increased importance of the "happy" intent object 105, the intent management engine 102 can alter the navigation results such that the user walks past the ice-cream parlor and has a memory of the moment with the daughter. Additionally, as the user is passing the ice-cream cone, the phone can present, via augmented-reality, a photo of the daughter or a suggestion to call her, perhaps to reminisce.

FIG. 2 provides an illustrative example of an intent object 105. An intent object 105 can be a data object representing a user's state of mind or an aspect of a user's total state of mind. This state of mind can be a reflection of user's mood, emotional state, physical state, medical state, or a combination thereof. The state of mind can further reflect aspects of a user such as a user's personality, past experiences, past environments, and past decisions. An intent object 105 is considered to be a persistent, ongoing, evolving data object that can exist beyond the occurrence of individual events or situations, changes in environmental factors, or the completion of goals or objectives related to or dependent on the intent object 105.

The intent object 105 can include attributes 210 that define the intent object 105. The attributes of an intent object 105 can be considered the factors or characteristics making up the state of mind represented by the intent object 105. These attributes 210 can also be links to other intent objects sharing similar attributes. The attributes 210 can also correspond with interaction attributes of interaction spaces, allowing for an association of an intent object with an interaction space for a particular situation, event, environment, or other occurrence.

Examples of attributes 210 of an intent object can include one or more of a user attribute, a demographic attribute, a goal attribute, a privacy attribute, a priority attribute, a location attribute, an intent identifier, rights, contextual maps, conceptual maps, emotional maps, or other attributes that define the nature of intent object 105.

The intent object 105 can also include rules 220 (e.g., class methods, scripts, APIs, etc.) regarding how the intent object 105 and the attributes of an intent object 105 can be modified or otherwise affected by other intent objects and/or by external occurrences. These rules 220 can include weighing or prioritizing of particular attributes, rules regarding the extent to which an attribute can be modified, expiration rules, rules regarding the creation of derivative intent objects, rules regarding which intent objects can interact with the intent object 105 and rules governing what external occurrences can affect the intent object 105.

The state of mind represented by an intent object 105 can be the current user's state of mind. However, intent objects can be created to reflect a past user state of mind. Likewise, intent objects can be created that can project a user's possible future state of mind. The state of mind could be defined according to an a priori defined ontology or a hierarchical namespace that represent possible known intents or mind states. The sensor data or interaction attributes can be analyzed with respect to semantic meaning, which in turn can be mapped to ontological intent objects for example.

An intent object 105 can represent the user's "instant" state of mind (i.e., the state of mind currently at the top of the user's instant priority or attention—"at the front of the user's mind"). An intent object 105 can also represent a user's state of mind not currently at the having immediate priority, but that still exists "in the back of the user's mind". For example, the intent object may represent a user's stressed state of mind. However, the stress may be of a lesser immediate magnitude or intensity than a more immediate feeling of being "hungry", and thus does not consume a user's immediate attention. Although this document uses the terms "state of mind" to reference intent object 105, one should appreciate that an intent object can be considered to be a digital model or digital representation of a person's current intent as interpreted from the environmental circumstances and user's interactions with the environment.

In some embodiments, an intent object 105 can be selected by the user. A user can select an intent object as a response to a direct question about their state of mind. The user can be presented the option to select a state of mind among a plurality. For example, in response to an event or situation, the system can ask if the user is happy, angry, sad, hungry, anxious, nervous, etc. (or ask a series of questions whose answers can be quantified into a determination of happy, angry, sad, hungry, anxious, nervous, etc.). The system can then apply an intent object 105 corresponding to the state of mind response from the user.

An intent object 105 can be suggested to the user, with the response confirming to the system that the suggested intent object 105 accurately reflects the user's state of mind. This approach is considered advantageous because the system can then learn to map correlations among interaction attributes to intents.

An intent object 105 can be created to represent a user's state of mind resulting from the existence or occurrence of a particular event, situation, environment or circumstance. The state of mind represented by the intent object 105 can be a state of mind that can (consciously or subconsciously) affect, predispose, or direct a person's actions towards a particular objective, result, choice or outcome. The triggering existence or occurrence can have existed or occurred in the past, or can be an existence or occurrence that will occur in the future. The triggering criteria that give rise to instantiating intent object 105 could also be based on a user's discovery of future events that are anticipated or expected to occur.

An intent object 105 can also represent aspects of or the totality of a user's personality. This type of personality intent object can be a long-term intent object, less susceptible to change by individual or short-term contextual factors or the occurrence of a particular event, situation, environment or circumstance. This type of intent object can also be used as an input, seed or template for the generation of derivative, relatively transient intent objects related to more rapidly evolving or more temporary user states of mind.

An intent object 105 can be of a prescribed duration or have a prescribed lifetime. For example, an intent object 105 can represent a person's mood for the day. An intent object 105 can have a limited duration expressed via decay. A particular intent object 105 can have an associated decay function, where one or more attributes of the intent object 105 are modified over time according to a decay formula. For example, the intent object 105 itself or attributes within the intent object 105 can be decreased in "value" according to a hierarchy, importance, applicability, or otherwise increasingly limited in function according to the decay function. Eventually, the decay function will cause the intent object 105 to fall in value to near-zero or below a desired threshold, at which point the intent object 105 can be deleted. In modifying an intent object 105, the intent management engine 102 can adjust the expiration time of the intent object. In embodiments, the prescribed lifetime can be in the form of a life-time attribute reflecting an expiration date or set duration, periodicity, etc.

An intent object 105 can be deleted or deactivated based on events, situations, or environmental triggers, which can collectively be referred to as "occurrences". These occurrences can be related to a specific purpose, objective or characteristic of the intent object, such as the completion of a goal or objective. In some cases, occurrences can be of sufficient magnitude (e.g., importance, weight, significance, etc.) that they can cause the deletion or deactivation of an intent object even if the occurrences are entirely unrelated to the intent object. These "critical" occurrences can cause the deletion or deactivation of an intent object because they render the further evolution or purpose of the intent object impossible or irrelevant. For example, a "job stress" intent object represents a person's stressed state of mind related to a current situation at work, such as an upcoming meeting or deadline. Typically, the job stress intent object can be affected and thus modified by factors related to the intent object, such as the completion of preparatory tasks or completing of goals leading up to the deadline. Unrelated occurrences or events of relatively minor importance such as the future release of a movie that the person is interested in typically would not influence the job stress intent object. The occurrence of a major event, such as the person being involved in a car accident on their way to work, can cause the deletion or deactivation of an intent object by making it impossible to further develop the intent object because, as a result of the accident, attending the meeting has become impossible or by making the intent object irrelevant because, as a result of the accident, the person is of a mindset where they no longer care about the meeting.

The modification of an intent object 105 by the intent management engine 102 can include an adjustment of one or more relevancy attributes of the intent object 105 with respect to the environmental interaction representation. The relevancy attributes of an intent object 105 are attributes used to determine how closely related the intent object 105 is to an event, situation, environment or other occurrence. Relevancy attributes can include a correlation between the interaction attributes of a particular interaction space for a particular environmental interaction representation and those of the intent object. The correlation indicated by a relevancy attribute can be a degree of similarity (i.e., for interaction attributes found to have associated intent object attributes via match, mapping, clustering, etc., how similar are their values), a collective similarity (i.e., how many correlated attributes or commonalities exist between the interaction attributes and the intent object attributes). Similarity can be measured based on a vector of attributes defined within a namespace and the Euclidean distance between the vectors, among other techniques (e.g., Hamming distance, Fisher information difference, etc). Thus, the adjustment to the relevancy attributes by the intent management engine 102 can be adjustments based on changes in the similarities or correlations between an environment (via the interaction attributes) and the intent object. In other words, the intent object becomes more or less relevant to a particular environmental interaction representation. As such, the relevancy attributes are adjusted such that the effect of the environment on various attributes of the intent object 105 is increased or decreased.

In one approach, the intent object 105 can be created based on a plurality of input information associated with intent object attributes. One or more of these input attributes can be trigger attributes that cause the instantiation of the intent object 105 as a function of the input attributes corresponding to the collected input information.

An intent object 105 can be created based on a combination of other intent objects. The intent object 105 can also be created based on one or more other intent objects and input attributes, triggering the creation of a new intent object.

The intent object 105 can be created based on a clustering of the associated attributes. A number of clustering algorithms may be employed. For example, k-means or k-median clustering algorithms can be used to form clusters of collected attributes. These collected clusters can then be instantiated into an intent object. Available attributes can be used for more than one cluster by changing the clustering algorithm to account for a particular type of intent object to be created. This allows for clustering according to certain similarities of the attributes while also forming intent objects whose characteristics can be influenced by attributes beyond those used in the clustering.

The intent object 105 can be created or modified based on a weighted consideration of the available intent object attributes. The attributes can be weighted based on how they relate to categories or levels of intent objects. The attribute weights can have a single value or have multiple values.

The attributes used in creating or modifying intent objects can be associated with gathered historical data about the user.

The attribute information can be gathered without explicitly requesting input from the user (other than perhaps requesting authorization from the user to gather data related to the user, so as to address privacy concerns). The data can be automatically gathered from sources such as social networks (including updates and posts created by the user and also created by others about the user), organizational memberships (e.g., customer loyalty programs, professional organizations, country club memberships, hobby or activity groups, online communities), government records (e.g., DMV records, criminal records, passport records, property ownership records, voter registration, etc.), medical records, health records, personal device data (e.g., cell phone, personal transaction cards, etc.), financial records, purchase records, credit reports, browser histories, internet search histories and any other accessible source of information related to the user. The records that are permitted to be accessed, as well as level of access to these permitted records, can be adjusted for privacy and security considerations.

Attribute information can be user-provided via data gathering interfaces that a user can respond to specifically for the purposes of creating intent objects. These data gathering interfaces can include questionnaires, surveys, location-based queries, consumer feedback questionnaires, personality profile questionnaires, psychological tests, intelligence tests, etc. The data gathering interfaces can be proprietary, existing questionnaires, or use a combination of both. For example, a user can be asked to input biographical, biometric and demographic data about themselves. The user can also be asked to provide important life events, and their reaction or feelings about those events. The user can be asked to provide information about their interests (e.g., favorite music, hobbies, season of the year, sports teams, etc.). The user can be asked to take personality or psychology tests. These tests can be tests typically used in a clinical or medical setting.

Attributes can also be derived by using gathered data corresponding to an output, wherein the attribute information is the inferred input resulting in the output. For example, if the gathered data includes data representing a status post on a social network, an implementation of a hidden Markov model can be used to narrow down the possible reasons or motivations for the user to post the specific post. The most likely factors that resulted in the status post can then be collected as attribute information for the generation of the intent object.

Attributes can include an importance factor attribute (also known as an importance attribute). The importance factor can be based on the relative importance of an intent object 105 at any given time, reflective of the immediacy or urgency of the intent within the totality of a user's state of mind. In other words, the importance factor can be considered to represent that an intent is "in the front/back of a user's mind". The importance factor can be based on spatial, logical, or temporal distance of the user from the attributes constituting the intent object. The importance factor can be based in part on the relative hierarchical level of the intent object. This allows for the adjustment of an intent object to match the current importance of the state of mind that the intent object represents within the user's immediate attention. It is important to note the difference between the importance factor and a relevancy attribute. As noted above, the relevancy attributes determine the degree or fidelity of the relationship between an intent object 105 and an environmental interaction representation—how closely related the intent object 105 is to a particular event, situation, environment, etc. Thus, it is possible that an intent object 105 has a high relevancy attribute value for a particular environment but a low importance factor for the environment because, at that particular moment, there are more pressing things on the user's mind. For example, considering an intent object 105 for a user reflective of the intent to keep their home clean, associated intent object attributes can include attributes associated with time required to clean the home, current distance from home, necessary supplies to clean the home, time since the last cleaning of the home, amount of supplies currently at home, etc. Based on an image representation (e.g. photo or video data) of a shopping mall, the intent management engine 102 can associate the interaction space of the shopping mall (e.g., a home improvement store or supermarket) with those of the necessary supplies needed to clean the home. Thus, the shopping mall environment can be deemed to be highly relevant (and thus have a high relevance score) for the intent object 105. However, the intent object attribute indicates the user last cleaned the home yesterday, indicative of the fact that it is unlikely the user needs to worry about that for a while. Thus, based on the "time since last cleaning" attribute, the intent management engine 102 determines that the importance of the intent object 105 is relatively low. As such, for the same intent object 105 and with regard to a same environment at the same time, the importance attribute for the intent object 105 can be low while the relevancy attribute is high.

Attributes can include an intent object level identifier that indicates the intent object's position within a hierarchy of intent objects. An attribute can include an identifier that indicates a permanence of the intent object. The permanence attribute is indicative of the ability for a particular intent object to be modified, including a resistance to change. Thus, the permanence attribute can be a modification factor to the relationship rules between certain intent object attributes of certain types between two intent objects and/or between interaction attributes and the intent object attributes of an intent object. The permanence attribute can serve to increase the effect of an external change on a particular intent object attribute (e.g., effect due to a change to a particular interaction attribute or other intent object's attribute).

Intent objects 105 can also be related to specific topics or categories of a person's life, such as specific activities, profession, career, medical necessities, cultural background, demographics, political beliefs, religious beliefs, or financial situation. In embodiments, intent objects 105 can be categorized according to these specific topics or categories and include a category attribute reflecting the same.

For example, an intent object 105 can be a travel intent, an educational intent, a gaming intent, a shopping intent, a health intent, an entertainment intent, a professional intent, a legal intent, a moral intent, a religious intent, a political intent, or other type of intent.

A travel intent can include a booking intent, a commission intent, a destination intent, a place of origin intent, a tour intent, a hospitality intent, a check-in intent, a route intent, a cargo intent, a luggage intent, a sightseeing intent, or a traffic intent.

An educational intent can include a teaching intent, a syllabus intent, a curriculum intent, a learning objective intent, a conditioning intent, an assignment intent, an exam intent, an evaluation intent, a mentoring intent, a note-taking intent, a certification intent, a discipline intent, an instructional intent, a grading intent, or a lecturing intent.

A gaming intent can include an objective intent, a strategy intent, a bet intent, a wager intent, an instructions intent, a rules intent, a score intent, a survival intent, a demo intent, a role-playing intent, a stealth intent, or a tactical intent.

A shopping intent can include a purchase intent, a selling intent, a delivery intent, a spending intent, a budget intent, a barter intent, a trading intent, a return intent, an exchange intent, a bargaining intent, a discount intent, a sale intent, a clearance intent, a manufacturing intent, a retail intent, an inventory intent, an auction intent, a commission intent, a sales objective intent, a storage intent, a display intent, a social intent, a gift intent, a credit intent, or a transaction intent.

A health intent can include a fitness intent, a diet intent, a strength intent, a cardiovascular intent, an exercise intent, a running intent, a swimming intent, a stretching intent, a weight-loss intent, a weight-gain intent, a muscle growth intent, a bodybuilding intent, an agility intent, a quickness intent, a speed intent, a nutrition intent, a fat-loss intent, a hygiene intent, a cosmetic intent, an endurance intent, a blood pressure intent, an energy intent, a flexibility intent, a performance intent, a recovery intent, a relaxation intent, a therapeutic intent, a toning intent, a training intent, a stretching intent, a skills intent, a warm up intent or a workout intent.

An entertainment intent can include an entertainment activity intent, a hobby intent, a holiday intent, a weekend intent, an anticipation intent, or a nightlife intent.

A professional intent can include a professional ethics intent, a career development intent, a job satisfaction intent or a professional courtesy intent.

A legal intent can be representative of a person's state of mind regarding the law. The legal intent can also be representative of a person's state of mind regarding compliance with one or more laws, including severity of the punishment associated with non-compliance. For example, the legal intent can reflect the fact that a person disagrees with a particular law and also the person's inclination to follow it depending on the nature of the law and punishment. In this example, a person may disagree with a speed limit and as such, not follow it unless they see a police car. Conversely, a person may disagree with tax laws, but they will pay their taxes regardless notwithstanding their opinion of the tax code.

A moral intent can be representative of a person's moral beliefs, such as what a person views as morally "right versus wrong". The moral intent can be derived based on a person's historical reactions to morally divisive issues, such as comments in emails, social networking, message boards, or choices in gaming situations.

A religious intent can be representative of a person's religious beliefs and state of mind regarding those beliefs. The religious intent can be based on a person's designated religion as well as their adherence to the customs, traditions or other beliefs associated with that religion.

A political intent can be representative of a person's political beliefs or ideals.

Figure 3:
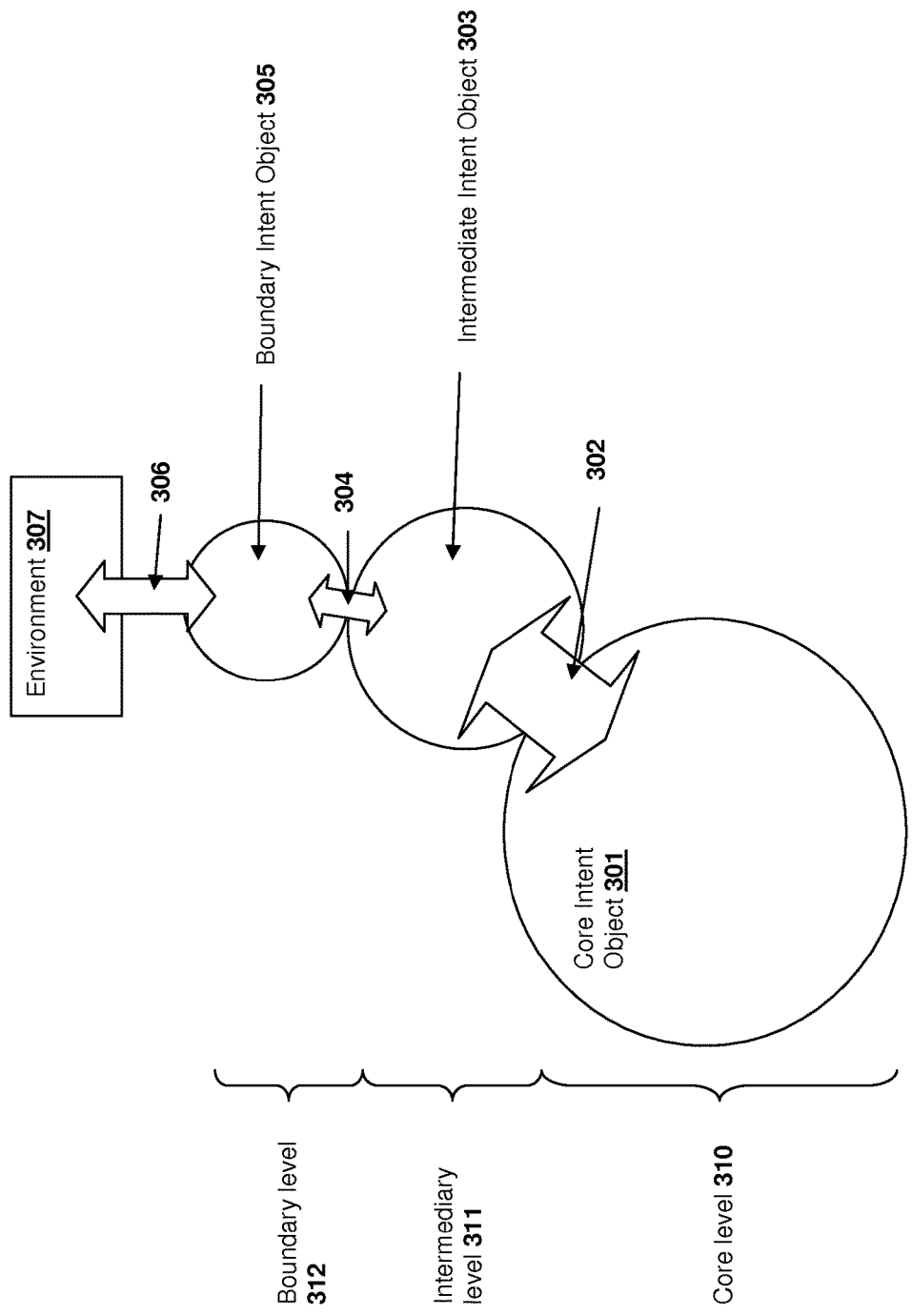
FIG. 3 illustrates a sample relationship between a user's multiple intent objects in a hierarchical relationship.

Multiple intent objects can exist concurrently for a user, having differing levels of permanence and importance, and across multiple categories. The different intent objects of a particular user may also have interconnections that allow for changes in intent objects to affect or modify other intent objects. FIG. 3 illustrates one possible example of the relationship between intent objects of different levels, and with external environmental stimulus. For the purposes of simplicity, FIG. 3 only illustrates three levels of intent objects. However, any number of levels can be used.

FIG. 3 illustrates a group of intent objects 301, 302 and 303 arranged in a hierarchical relationship. Each intent object 301,302,303 has connections 302,304,306 establishing the relationship between the individual intent object and external influences. The external influences may be other intent objects or other external occurrences, such as those originating from the environment 307.

In the example illustrated in FIG. 3, a user can have one or more "core" intent objects 301. These core intent objects 301 can be euphemistically considered the user's "digital soul" with respect to their intentions. In other words, the core intent objects 301 can be considered a representation of a user's personality, the collection of core psychological and personality traits and fundamental beliefs that makes the person who they are as represented by their intentions. A user can have one or more central core intent objects 301 representing a core level 310 of intent objects. Intent objects of the core level 310 represent the aspects of a person that change slowly over a long period of a person's life.

The intermediate intent object 303 represents an intermediary level 311 of intent objects, having intent objects that change more quickly than those of the core level 310, but are not generally created or destroyed by instant or singularly identifiable occurrences. There can be multiple intermediate intent objects 303 that form the intermediary level 311 between the core level 310 and the boundary level 312.

The boundary intent object 305 represents a boundary level 312 of intent objects. Intent objects within boundary level 312 are typically capable of being directly affected by instant occurrences (e.g., events, situations, environments) from an external cause, such as the environment 307. These intent objects can be of relatively low permanence or duration, representing shorter, relatively transient states of mind.

In a hierarchical organization, an intent object can be both an intermediary intent object 303 and a boundary intent object 305, depending on the attributes of the intent object and how the attributes may be affected by the environment 307.

The connections 302, 304 in FIG. 3 illustrates that intent objects 301 and 303, and 303 and 305, respectively, are interrelated. For interrelated intent objects, a change or modification to one intent object can result in a corresponding change in a related object. The relationship between two intent objects can be established and governed by relationship rules belonging to the intent objects and to the system as a whole. For example, in a hierarchical relationship such as the one illustrated in FIG. 3, a relationship rule can include rules that an intent object can only have a direct relationship with intent objects of a hierarchical level below, a hierarchical level above, or of the same hierarchical level. The interrelationship between intent objects can be established and governed according to the attributes of the intent objects. For example, intent objects can be connected according to overlapping, or common attributes shared by the intent objects. Certain attributes of an intent object can include rules or pointers to other attributes of other intent objects establishing a relationship between the attributes. The attributes of an intent object can include weighing or factoring algorithms or functions that can adjust how a particular attribute can be changed in response to a change in a neighboring intent object.

Changes or modifications of an intent object can ripple across a chain or network of interconnected intent objects according to the rules governing the connections and attributes. For example, in the hierarchical organization of intent objects shown in FIG. 3, a change to a boundary object 305 resulting from an external occurrence originating in environment 307 can cause a change in intermediate object 303, which in turn can modify core intent object 301. However, as the intent objects are closer to the core level 310, they are increasingly resistant to change (illustrated in FIG. 3 by the relative size of the intent objects 301, 303 and 305). To ensure that the changes in an intent object are properly propagated among the hierarchy, the relationship between the intent objects take into account the size and/or hierarchy of the neighboring objects, and therefore, the magnitude of the effect of the rules or attributes of neighboring intent objects have on the intent object. Thus, in the illustrative example of FIG. 3, the interaction between intent objects can be visualized as being a relationship between circular gears or discs of different sizes, whereby the angular displacement (i.e., rotation) of the illustrated intent objects 301, 303, 305 corresponds to the amount of change to each intent object. As in a set of gears, an angular displacement of a larger intent object (such as core intent object 301) results in a larger angular displacement of a smaller intent object (such as intent object 303) that rotates with it, which then causes an even larger angular displacement of smaller intent objects connected to it (such as intent object 305). This angular displacement can correspond to a change to a single attribute of the intent object or more than one attribute of the intent object.

The relationship of boundary object 305 with intermediate intent object 303 can include a commonality of a plurality of attributes, determined via a mapping of attributes of a like type or kind, or of a similar kind as determined via clustering or other statistical analysis. The relationship rules between these attributes can include proportionality rules, where an attribute or change in attribute in one intent object results in a proportionally adjusted attribute or change in attribute. For example, a change in an attribute of boundary intent object 305 will cause a proportionally reduced change in a corresponding attribute of intermediate intent object 303. Conversely, a change in an attribute of intermediate intent object 303 can cause a proportionally large change in a corresponding attribute of boundary intent object 305. This enables the system to gradually modify the objects 301 of core level 310 over time in response to changes in relatively transient or situational objects 305 and intermediaries 303, thus reflecting how short-term, individual situations or events can drastically change a temporary state of mind, but gradually change more permanent states of mind and very slowly evolve aspects of a person such as their personality, beliefs, etc. Likewise, a change to a core object 301 will propagate outward towards the boundary level 312, and the effect on each subsequent intent object is increased, ultimately causing a large change to the corresponding attributes of boundary intent object 305. A change to attributes of core intent objects 301 can be of a sufficient magnitude to result in the deletion or elimination of one or more of the intent objects 303,305.

In a hierarchical relationship, the elimination of a lower-leveled intent object (for example, 303) can result in the elimination of higher-leveled intent objects "supported" by the lower level object (for example, 305).

In embodiments where multiple core intent objects 301 are used, each core intent object 301 can be generated and categorized according to general personality traits. The traits can be defined according to desired target classifications of users. For example, the personality traits can correspond to psychological or personality characteristics or traits as defined, outlined or otherwise characterized by professional authorities (e.g., psychological authorities, medical authorities, etc.). In embodiments where a single core intent object 301 is used, the single core intent object 301 can be instantiated from an analysis of a user's personality traits.

As discussed above, an intent object can be used as a seed or template to generate other, related intent objects which can be referred to generally as "derivative intent objects". In a hierarchical structure, a derivative intent object can be generated according to a rule set associated with one or more attributes of the seed intent object. The rule set can include changes to the one or more attributes that trigger the creation of the derivative intent object. The rule set can include the presence of one or more attributes in the seed intent object combined with a particular occurrence originating from environment 307 that gives rise to the derivative intent object. The derivative intent object can include one or more attributes from the seed intent, as well as attributes and rules unique to the derivative object. The unique attributes can be hierarchically-appropriate attributes or rules, environmental occurrence-related rules, or rules related to the use of the derivative intent object as a seed or template object itself.

In embodiments, intent objects can be generated and/or modified by the intent management engine 102 in a digital model according to the illustrated circular/gear model illustrated in FIG. 3. In these embodiments, the attributes of the intent object are correlated to the properties of a disc or gear, and their interactions modeled accordingly. For example, size of the intent objects can be based on the hierarchy level attribute of the intent object, whereby each hierarchy level has a range of sizes corresponding to the respective hierarchy. Within those ranges, the actual size of the intent object can be dependent or based on the intent object attributes such as permanence, importance, relevancy, duration as well as proportionality rules between two intent objects. Because intent objects are multi-dimensional and can have relationships with multiple intent objects according to different associations of different attributes or combinations of attributes, a single intent object can react or change differently to two different, separate intent objects that act upon it. Thus, a single intent object can have two relatively different sizes in their interactions with two different other intent objects because of the proportionality rules. As discussed above, a duration attribute can correspond to a decay function of an intent object. Thus, duration attributes can cause an intent object disc to decay in size over time. Importance attributes, and relevancy attributes can still cause the disc to increase in size, but due to the duration attribute the disc will decay in size over time and, if no additional increases in size occur, will eventually decay to a size of zero and cease to exist.

In embodiments, the intent object discs can be considered to be modeled by the management engine 102 as mass-less discs, thus the changes (i.e. rotation) of one intent object influences another, and the degree of rotation of each is solely governed by their respective sizes. In these embodiments, then, the angular displacement across the entire system can be considered to be conversed.

In some embodiments, the modeling of intent objects as discs or gears can include a mass attribute. In these embodiments, the mass attribute can be correlated to the hierarchy level attribute of the intent object (instead of having it influence the size). The type or category of intent object (according to its category attribute) can also be used to influence the mass of a particular intent object disc. In this case, the mass attribute of an intent object corresponds to a density of the object, and the total intent object mass at any given time is then calculated based on the size of the particular intent object which can be dependent on the importance and relevancy intent object attributes as discussed above (not including the hierarchy level or permanence attributes). In these embodiments, the permanence attribute of an intent object is modeled as a force or a coefficient of friction opposing a movement to an intent object disc, and the interaction attributes derived from the interaction space and the environmental interaction representation as described above can be considered to be forces acting on the intent object disc to move the disc. Thus, to determine the change in an intent object by the interaction attributes of a particular environment, the intent management engine 102 can apply the force represented by the interaction attributes to the intent object disc. By taking into account the opposing forces (based on the permanence attributes) and the disc's moment of inertia, the intent management engine 102 can then determine how much an attribute has changed according to the angular displacement of the disc. If the interaction attribute forces aren't sufficient to overcome the moment of inertia and coefficient of friction, then the intent object will not be changed because the disc will not rotate. It should be appreciated that mass and force represent a physics based metaphor through which intent object interactions can be modeled. The parameters of such physics models can be established through empirical analysis of training data and testing data (e.g., initial estimates adjusted based on user surveys, etc.).

It should be noted that in these embodiments, the modeling of intent object discs can be performed system wide (i.e., linked intent object discs all serve to resist an interaction attribute force, so the interaction attributes must be sufficient to overcome the collective resistance of the system to affect even the boundary layer intent object) or individually between locally (i.e., two immediately adjacent) interacting elements (intent object discs, or an intent object disc and interaction attributes of an environment) one at a time. Where the changes are modeled individually, the interaction (such as interaction 306) for a boundary layer intent object disc (such a boundary level intent object 305) is first modeled for the interaction with the interaction attributes of an environment (such as environment 307) only, without any influences by other intent object discs; subsequently the interaction (e.g., interaction 304) between the boundary layer intent object disc and the next layer intent object disc (such as with intermediate intent object 303) is modeled based on the properties of both discs and the determined movement of the boundary layer disc, and so on.

In the example of FIG. 3, interactions 306 with environment 307 are shown as two-way interactions via a bi-directional arrow. As described above, the interaction 306 into the system (i.e. towards boundary intent object 305) corresponds to the interaction between interactive attributes and the corresponding intent object attributes of the intent object 305. However, the outgoing attributes (i.e., arrow towards environment 307) can be considered to represent the adjustments to an output device action based on the change to one or more of the intent objects 305, 303, 301, such as in response to the interaction attributes of the particular interaction space according to the particular environmental interaction representations of the instant environment and/or other interaction attributes or other intent objects that cause changes to the intent objects 305, 303, 301.

In addition to intent objects, embodiments of the inventive subject matter can generate, modify and use thought objects associated with a user. A thought object can be a data object representing a product of a user's mental activity. The product can be the result or outcome of mental activity triggered by a stimulus (e.g., sensory, intellectual, physiological, psychological, emotional, etc.). Examples of a product of mental activity can include an idea, an observation, a conclusion, an opinion, a memory, a consideration, a reflection, a belief, an interpretation and an understanding. Although the thought object is described with respect to mental activity, it should be appreciated that the thought objects are digital models and derived based on observable sensor data.

The thought object can be related to, associated with, based on, or directed to the stimulus that triggered the formation of the user's mental product based on observed sensor data. Examples of stimuli can include one or more of a single real-world object (e.g., the user's first car, etc.), a type of a real-world object (e.g., all cars of the same make and model), a collection of real-world objects (e.g., all of the furniture in a user's living room collectively), a story, a particular person (e.g., wife, boss, etc.), a group of people (e.g., family, friends, golf buddies, co-workers, etc.), an event (e.g., a user's wedding, graduation, etc.), a series of events, a specific time, a specific date, a recurring date (e.g., a user's birthday, the day rent is due every month, etc.), a time period (e.g., a user's college years, the 1985 Chicago professional football season, etc.), a place, a sound, a scene, a song, a video, a game, a smell, a color, a taste, a tactile sensation, a situation, an image, an institution (e.g., a particular company, the user's employer, the user's college, etc.), an account (e.g., a financial account, email account, etc.), an electronic profile (e.g., social network profile, online gaming profile, etc.), a news item, an environment, an experience, a problem, an injury, an illness, a medical procedure, an education, a profession, a job, a career, a place, a location, a culture, a geographical region, a country, a state, a city, a food, a hobby, an activity, a debate, an intellectual exercise, a riddle, a joke and an anecdote.

A thought object can include attributes that define the thought object. The attributes of the thought object can be considered the factors or characteristics of the product of a user's mental process. The attributes can be reflective of the product itself, aspects of the process that gave rise to the product, and/or the stimulus that triggered the mental process. Examples of attributes of a thought object can include a thought object identifier, a thought object type attribute (e.g., identifying the thought object as an idea, an opinion, an observation, etc.), a stimulus attribute (e.g., what stimulus is the thought object related to, associated with, based on, in response to, etc.), a time attribute, a duration attribute, a knowledge attribute, a sentiment attribute (e.g., a person's sentiment, feeling and/or predisposition regarding the subject of or stimulus associated with a thought object, emotions associated with the), a user attribute, a demographic attribute, a location attribute, a relationship attribute (e.g., what is the user's relationship with the subject of the thought object), and other attributes that define the thought object.

The knowledge attribute can be representative of what a person "knows" with regard to a mental process, a mental process product and/or a stimulus, independent of sentiment. For example, a person observing a car that looks blue to them "knows" that the car is blue. As such, the knowledge attribute for a thought object associated with that particular car for that person reflects the user's personal knowledge that they see the car as blue. The knowledge attribute does not represent the person's feelings or attitudes—so in the car example, the knowledge attribute does not indicate whether the person feels positively or negatively about the color blue used in the car, whether it looks good on the car, whether it's the right shade of blue, etc. Because a knowledge attribute can be based on a person's personal knowledge, the knowledge attribute is not required to be objectively or factually correct, or objectively or factually complete. For example, the visual perspective of a small child can be different from that of a tall adult, or from two people having different levels of eyesight quality. As such, the knowledge attribute for each person can be different, even if they are associated with the same stimulus.

The thought object can include an awareness attribute, reflective of a level or amount of a person's awareness of the stimulus and/or thoughts regarding the stimulus itself. This can be used to account for the fact that a person does not have immediate recollection of all of their ideas, observations, memories, etc. at all times, that sometimes the person's awareness of these thoughts can wane or fade, and that sometimes a person can be aware of something but routinely ignore it (e.g., background things, things seen daily as part of a habit, etc.). The thought object can also include an association attribute, corresponding to associations that the stimulus associated with the thought object can have with other stimuli. In an embodiment, the association attribute can be considered a link to other thought objects sharing similar attributes or to other thought objects having an established relationship. The association attribute can further reflect the strength of the association or interconnection of the stimuli. This awareness and association can include an awareness of what an object is, what it represents to the person on its own, what it represents to the person in combination with other things.

Thought objects can be reflective of entirely objective knowledge, entirely subjective knowledge, or a combination of objective and subjective knowledge. For example, a thought object regarding a mathematical principle, concept or formula can reflect the objective knowledge of how the principle is used in mathematics, or what an answer might be given an objective input. The same thought object can also reflect a subjective knowledge by the person, such as an opinion on whether the concept is difficult or easy, how useful it is in a practical application, whether the user feels it is 'worth' learning or mastering, etc.

If intent can be considered a person's state of mind that might direct the person's actions towards an objective, outcome, result, goal, etc., then thoughts can be considered to be independent of motivation. Thought objects are self-contained, meaning the thought objects are not purpose-driven with respect to a user's actions. In other words, thought objects can be considered as a representation of the effect or outcome arising from stimulus experienced by a person.

A thought object can be generated by identifying a stimulus that a user has experienced, and gathering attribute information reflective of a product or result of a user's executed mental process in response to the stimulus or associated with the stimulus. The stimulus can be identified, and the attribute information can be gathered via some or all of the sources used to gather intent object attribute information, as described above. For example, to identify what a user considers to be "blue" in the car example above, the intent management engine 102 can search for and retrieve user interactions in social networks (for instances where the user has discussed color-related topics, commented on photographs, edited their own photos or videos, etc.), web browser usage (which in this example could include the user's activity on art-related websites, websites that allow a custom build of a new car, photography websites, etc.), user interactions with applications such as photo or video editors, etc.

The thought object can include a trigger related to the thought. The trigger can be the particular stimulus that gave rise to the thought object, and the system's recognition of the stimulus can be used to trigger the system's use of the thought object after the thought object has been created.

In embodiments, the system can include thought object templates corresponding to general knowledge concepts common to groups of people, such as based on studies, surveys, etc. The templates can be categorized according to various types or groups of knowledge and contain null values for their corresponding attributes, which are then populated by the intent management engine 102 when the thought object for a user is instantiated. Examples of categories of thought objects can include language, mathematics, colors, size perception, vehicles, people, places, home objects, office objects, distance perception, etc.

Thought objects can be modified over time, reflective of how a user's thoughts about a particular circumstance in their life changes over time. For example, the strength or intensity of a user's feeling about an event in the past may fade over time. As such, the subjective aspects of the thought object and their ability to affect related thought objects or intent objects will decrease over time.

The system can be used to enable a communication between people via objects having a particular meaning or significance to those people. As such, the system can create a social network of thoughts based on associations of thought objects belonging to different people, such as thought-objects related to the same real-world object. People with similar thoughts about a particular real-world object, for example, can be grouped together into a social network together, such as to share their thoughts, experiences, etc., about the object. The system can also be configured to present prompts or suggestions based on thought objects tied to the detection of real-world objects.

For example, suppose that a user has fond memories of spending summers growing up at the family lake house. In particular, the user has fond memories of helping his father with the barbeque, where the user and his father would share this bonding experience over a particular brand of cola. In the digital space, the user has a thought object associated with the particular brand of cola, including a positive affinity for the brand of cola based on the association of the cola with those special moments in the user's life. The cola thought object can also have associations with other thought objects, such as thought objects related to the time periods fitting the user's memories (the childhood summers in which these events occurred, or childhood in general), with a thought object related to the user's father and/or family, and thought objects related to a particular scene (e.g., a summer evening, sun setting, lake in the background, etc.), among others.

At some point, the user takes a photo using the camera of their mobile device, where the photo contains a cola bottle of the same brand (alternatively, the photo could contain a sign, billboard or advertisement for the cola, or be a cola delivery truck of the brand, etc.). The photo does not necessarily have to be specifically of the cola bottle, only that the bottle appears somewhere in the photo, even if only coincidentally or by accident (such as in the background). Using image recognition techniques, the system can recognize the cola bottle in the photo and trigger the recollection of thought objects associated with the imagery of the cola bottle. In this case, the user's thought object about the cola bottle itself, along with the positive feelings that the user associates with the cola bottle from their memories of the summertime barbeques. The system further identifies thought objects having associations related to the cola thought object and the positive feelings associated therewith, such as the thought objects associated with the user's father, the lake house setting, the summertime periods, etc.

In this example, the user's father can also have his own digital soul, including his own thought objects, such as a thought object about his son (the user). Because the user and his father each have thought objects about the other, they can be socially networked via their thought objects.

In one scenario of the example, the system can use the established associations to trigger an action on the user's device. For example, based on the identification of the cola bottle in the image, and the subsequent identification of the user's thought object regarding the cola ("cola thought object") as well as the associations of the cola thought object to other thought objects, such as the thought object regarding the user's father, the system prompts the user to send his father a message, such as a short text or email message, voice message or video message.

In this example, suppose the user selects to send the father a text message. Responding to the prompt can initiate a message drafting platform, where a text message can be drafted. The text message can include metadata such as the line or chain of interconnected thought objects that resulted in the prompting of the message, including metadata regarding the identification of the cola bottle as the 'trigger'.

The father, as a user of the system himself, will have thought objects of his own associated with his own thoughts, in response to stimuli from his own life. As such, the system can use the metadata from the message to associate the message with one or more of the father's thought objects.

To receive the message, the father can be required to view or otherwise experience the trigger that gave rise to the prompt that the user used to create the message. In this example, the trigger for the father to receive the message can be to have his own device capture a cola bottle of the same brand. This message delivery can be tailored to be a surprise, where upon the device spontaneously capturing an image including at least part of the cola bottle (e.g., by accident, or the bottle is in the background of a photo taken for other purposes, or a purposeful imaging of the cola bottle for a different purpose by the father, etc.), the father's device can provide a notification of the message. Alternatively, the device can bring up the message automatically and surprise the father with a message from the user as the father's device is capturing images having the bottle. In another example, the message delivery can be associated with a prompt to specifically capture an image including the cola bottle to receive the bottle. For example, the device can prompt the father that "there's a message for you inside the cola bottle—take a photo of the bottle to receive it!" In yet another example, the system can provide a subtle cue for the father that the cola bottle has 'something' for him—such as superimposing a glow on the bottle via the screen of the father's device.

If the father is not a member of the system, the message can be sent to the father via traditional message communication channels (e.g., email, SMS, MMS, existing social networking sites, etc.) and include an ad for the beverage and/or a copy of the image that includes the beverage bottle captured by the user's device that functioned as the trigger for the message composition.

In another illustrative example, a user's thought objects can be used to used to observe the interconnections and inter-relationships of real-world objects as they relate to a user, and the way the thought objects associated with the real-world objects are interrelated, how they modify each other, and ultimately, how they shape a person's understanding of the world around them.

In observing the representation of the interconnection of thought objects related to real-world objects, it is possible to construct a "digital feng shui" of the thought objects in a person's life. This digital feng shui can be spatial (relationship of objects in a room) or temporal (relationship of objects over the course of a day, month, etc.).

In this example, the digital feng shui can be used to balance real-world objects in a person's environment according to the thought objects associated with the real-world objects, as well as associations between the thought objects corresponding to the real-world objects.

The strength and/or intensity of thought objects associated with real-world objects can be thought of as an "aura" of the real-world object. The links between the real-world objects (via associations between their respective thought objects) can be influenced by the strengths of their respective auras and their spatial and/or temporal distances. The relative strength or intensity of the thought objects for the individual person, corresponding to individual real-world objects and/or to collective groups of real-world objects, can be used to arrange the real-world objects in a person's environment.

For example, the aura of different real-world objects in a person's environment can be used to arrange real-world objects to strike a harmony and balance for the person in the environment. In this example, the real-world objects can be arranged such that the positive effects of the real-world objects (e.g., those objects to which the person attaches positive thoughts, feelings, emotions) are maximized and the negative effects of the real-world objects are minimized. This can include grouping real-world objects whose combined positive effects (via their thought objects associations) are greater than that of the sum of each of the real-world objects separately. This can also include distributing real-world objects around the room so that "negative" objects are cancelled or otherwise countered by "positive" objects.

In an office environment, the aura can be used to create a workstation or desk environment whose arrangement is designed to increase productivity based on the individual's styles, habits, associations, techniques, and other unique factors related to the individual's performance of their job functions. In the office example, thought objects associated with different tools around the workstation (e.g., stapler, computer mouse, keyboard, monitor(s), pens, pencils, desk drawers) can be linked according to how the user uses them, and also the user's thoughts regarding the objects as related to a job function. The thought objects can include habitual information such as what hand a user typically uses to access, hold, grab, use, or otherwise interact with the real-world object. The office environment aura, then, reflects real-world objects and combinations of objects organized so that they are 'natural' to the individual.

The aura of real-world objects in an environment can be presented to a user via an output device, such as a computing device having one or more of a display, audio outputs, sensory feedback (e.g., vibration, etc.), a camera, etc.

In an embodiment, the aura can be presented visually through augmented reality applications. As the thought objects and their strengths are accessed by the system after detecting associated real-world objects, such as by using the device's camera, the visual representation of the aura can be overlaid or superimposed over the depiction of the real-world object on the device's display screen. The aura can be represented as a light, a glow, an energy field, etc., that emanates from the real-world object. The aura can visually dissipate over a certain distance according to the strength of the aura, such as by decreasing in visual intensity, opacity, etc. Aspects of the thought objects (e.g., aspects or characteristics of the thoughts associated with the object) can be represented by the colors used in visually presenting the aura. For example, a "positive" aura can be represented by a color that the individual likes or that might typically be associated with positivity (e.g., lighter colors, greens, etc.), whereas "negative" auras can be represented by colors that the individual dislikes or that are typically associated with negativity (e.g., darker colors, scarlet, gray, etc.).

As real-world objects having associated thought objects are brought into proximity with one another, the visual auras can interact to illustrate a combination of the auras. The visual representation of the auras can include visual effects similar to that of a mixing of liquids, including a merging of colors of different liquids into a common mixture color. When the joining of the auras has an augmenting effect, the intensity of the auras can be increased, and the aura "source" can be visually represented as originating from both, similar to that of pools of light.

In embodiments, thought objects related to a particular real-world object (e.g., an individual and unique object, a type of object, a class of object, a brand of object, a specific product, etc.), can be gathered over time and used to form a thought object specific to the real-world object that is independent of any one person or group of people. Additional thought objects related to the real-world object can then be used to contribute to the evolution of the independent thought object over time. The thought objects used to create and shape the independent thought object can be thought of as the real-world object's "memory". This independent thought object can interact with other thought objects of other real-world objects, and can interact with thought objects belonging to individuals as well as other independent thought objects. The interaction between independent thought objects can be used to give real-world objects context in an environment without a particular human's thought input as to the context, the real-world objects, or the environment.

These links created between real-world objects via associations of independent thought objects can be used to enable communication between the real-world objects via their thought objects, such as by modifying their respective thought objects. For objects having the capacity to communicate data (e.g., computing devices, cellular phones) regarding themselves and/or their environment, the communication can be with one another, or enabled via a common computing device, such as a server, that can send and receive data from these devices. For objects lacking any data communication capacity, the communication can be effectuated when the objects in an environment are detected, such as by a camera in a user's computing device, phone, etc.

In another example, a person's thought objects can be used to construct a mind map, such as according to thought object associations. The system to retrieve and present content related to the thought objects according to the mind map, and present the content to the user. The content can be presented in a collage fashion, which can minor the mind map, and can also incorporate a user's particular perspectives regarding the triggers for the thought objects.

In another example, a person's thought objects can be used to construct a diary of thoughts, according to a topic (e.g., the stimulus, real-world object, etc., associated with the thought object, an associated topic, a category, etc.) or temporally (e.g., organizing a day's thoughts based on thought objects created/modified/called upon during that day).

Intents and thoughts can be intertwined in a person's consciousness. If intent can be considered the person's state of mind, then thoughts can be considered interpretations, opinions, ideas, observations, conclusions, etc., drawn from a stimulus that can give rise to or change a state of mind. Conversely, while a thought can be considered the product of a mental process without an influence on a person's actions or motivations, intent can cloud or modify a thought, such as by clouding or modifying a person's perception of the stimulus or affecting the mental process that results in the product. As such, intent can be considered to be a prism or filter affecting a view of a thought and/or the connections between thoughts in a particular way.

For example, a person's state of mind at a particular point in time may cause the person to disregard a thought or aspects of a thought, or may cause a person to improperly or incompletely interpret a stimulus. A person that is angry might disregard their thought regarding the consequence of an action. A person that is tired when reading a science journal might miss certain pieces of data within the journal, or misinterpret the conclusion, and thus form a thought about the article that is different from the thought they would have formed if reading the article while rested.

As such, intent objects and thought objects can have associations that can affect, modify, or otherwise change one or more of an intent object, a thought object, an association between thought objects, an association between intent objects, and associations between thought object(s) and intent object(s).

Figure 4:
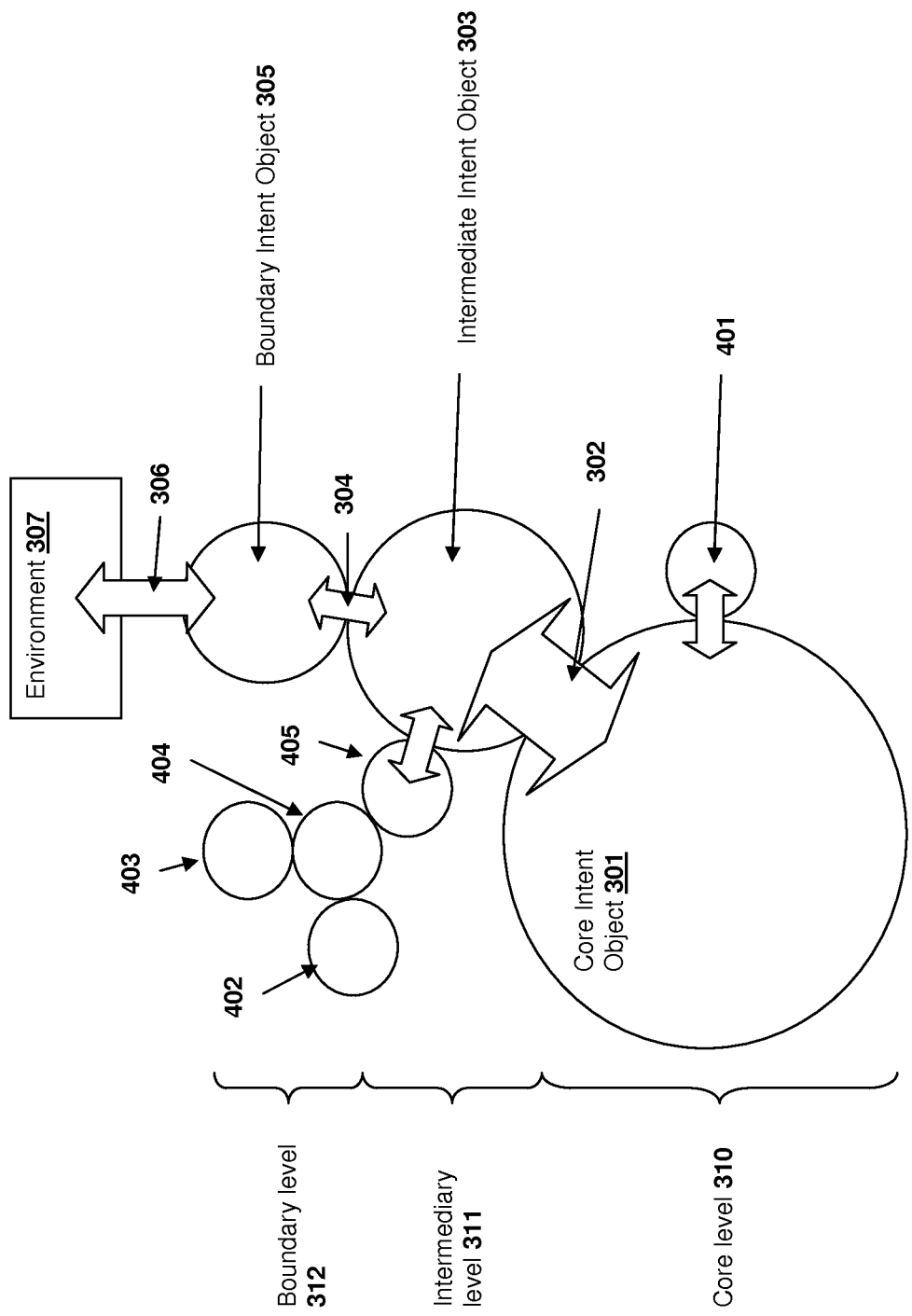
FIG. 4 illustrates a sample relationship between a user's multiple intent objects and thought objects.

FIG. 4 provides an overview of an environment that includes a combination of intent objects and thought objects. The example illustrated incorporates thought objects 401-405 to the intent objects of FIG. 3.

As shown in FIG. 4, thought objects can interact with and affect one or more intent objects associated with a user. The effect that a thought object has on an intent object can depend on various factors of the thought object and intent object as expressed by their respective attributes, such as the level of the user's awareness regarding the thought object, the nature of the association of between the thought object and the intent object, the intent object's level, etc. As such, a person's digital soul can be the combination of the person's core intent objects and associated thought objects.

Thought object 401 is illustrated as having a relationship with core intent object 301, and as such the effects of the relationship can be considered to be direct. Thought objects 402-405 are illustrated to only have a relationship with intent object 303 via thought object 405. Thus, the effect of the relationship can be considered direct for intent object 303 and thought object 405, and indirect for the intent object 303 and thought objects 402-405. Depending on the relationship between the thought objects 402-405, the effects of the relationships (e.g., direct, indirect or both) between the thought objects 402-405 and intent object 303 can be magnified, diminished, or otherwise modified. For example, if the relationship of the thought objects 402-405 are collectively amplified because of their associations (such as in the aura example above), the relationship with the intent object 303 can be considered to be with a collective thought object made up of thought objects 402-405. On the other hand, if the relationships of the thought object 402-405 do not result in the collective amplification of the thought object, the effects between the thought objects 402-404 and the intent object 303 can be diminished or decreased. The decrease can be due to a decrease of the effect as it permeates outward through a chain of thought objects (e.g., effect is strongest between objects 405 and 303, then decreased between objects 404 and 303, then further decreased between 402/404 and 303). The decrease can be because the factors that lead to the relationship between thought object 405 and intent object 303 are not shared among all of the other thought objects 402-404, and as such any effects between intent object 303 and those thought objects 402-404 do not have the common factors through which to be "channeled".

In a modified version of the example between a user and his father above, the system can use a combination of intent objects and thought objects to carry out the functions described therein. In this example, the user can have existing intent objects related to the father (e.g., intent objects related to father's day coming up and thus, to call the father, buy the father a gift, etc.), which can be used to prompt the communication, including the nature of the communication and also to include suggestions regarding gifts, stores where to buy the suggested gifts, etc. The generation of the communication itself can be based on an intent object to communicate with the father, which can be generated based on the thought object associated with the detected cola bottle, as well as the associations of the cola bottle thought object with the other thought objects of the user described in the example.

In embodiments incorporating independent thought objects for real-world objects, the system can further generate independent intent objects for real-world objects, which are independent of any particular individual or group of individuals. In one example, the independent intent object can be representative of a real-world object's "purpose", as well as reflective of the real-world object's "desire" to fulfill that purpose. The purpose can be a global purpose (e.g., a car's purpose is to provide transportation) or a specific purpose (e.g., a particular car's purpose is to travel from point A to point B on a specific trip, to be a rental car, etc.). The independent intent object can be generated or affected by the independent thought object, which can include the real-world object's "thoughts" on what it is. The independent intent object can be generated from an aggregation of thought objects and/or intent objects from individuals that are related to the real-world object, collected over time. As such, what the world "thinks" of a real-world object can give rise to an independent intent object motivated by those thoughts. The independent intent object can similarly modify or change the independent thought object, reflecting how a motivation or intent can affect a thought by clouding the thought, affecting interpretation, etc. The combination of independent intent objects and independent thought objects can be considered a real-world object's digital soul, which can affect the relationships that the real-world object has with other real-world object (via the interaction with the digital souls of the other real-world objects).

It is contemplated that the system described above can be implemented to enable a person to use their mobile device as a "magic wand" that can interact with the physical world, enabling the discovery of information, links, collected wisdom, thoughts, ideas, etc., "hidden" within the objects that make up the physical world and invisible to the naked eye. The system enables this implementation of the discovery of and engagement (e.g., interaction, transactions, etc.) with the physical world through a user's mobile device, as an extension of the user's interpretation of and existence in the physical world.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of controlling an electronic device to learn intents of a user and control output actions based on intents, the method comprising:

providing access by the electronic device to an intent management engine;

providing access by the electronic device to an intent database configured to store intent objects according to interaction attributes;

obtaining, by the intent management engine, an environmental interaction representation related to an environment of the electronic device, including obtaining sensor data from two or more of the following sensors; a camera, a microphone, a thermometer, a global positioning system (GPS) sensor, a mechanical sensor, a chemical sensor, a biometric sensor, a hall effect sensor, an accelerometer, a pressure sensor, a compass, a magnetometer, a gas sensor, a speed sensor, a breathalyzer, an electrochemical sensor, a touch display, an optical sensor, a proximity sensor, a vibration sensor, a piezoelectric sensor, a capacitive sensor, a resistive sensor, a current sensor, a magnetometer, a voltage sensor, a liquid sensor, and a weight sensor, and forming the environmental interaction representation based on the obtained sensor data;

deriving, by the intent management engine, interaction attributes within an interaction space as a function of the environmental interaction representation;

modifying, by the intent management engine, at least one intent object from the intent database based on the interaction attributes, wherein the at least one intent object includes a life time attribute;

outputting, by the electronic device, a request for confirmation by the user of a user state of mind corresponding to the modified intent object;

receiving input from the user indicating whether the user state of mind is confirmed;

using the user input to map a correlation between interaction attributes and the modified intent object; and configuring an output device, by the intent management engine, to adjust an output device action according to the at least one modified intent object.

2. The method of claim 1, wherein the step of modifying the at least one intent object includes at least one of instantiating, removing, deleting, activating, deactivating, classifying, archiving, exporting, forwarding, importing, receiving, tagging, duplicating, selecting, and adding information to the at least one intent object.

3. The method of claim 1, wherein the step of modifying the at least one intent object includes adjusting the expiration time of the intent object.

4. The method of claim 1, wherein the step of modifying the at least one intent object includes adjusting a relevancy attribute of the intent object with respect to the environmental interaction representation.

5. The method of claim 4, wherein the relevancy attribute is multi-valued.

6. The method of claim 5, wherein the relevancy attribute comprises multiple dimensions according to the interaction space.

7. The method of claim 1, wherein the life time comprises a duration.

8. The method of claim 1, wherein the at least one intent object comprises at least one of a proposed future intent object, a current intent object, a suggested intent object, and a user selected intent object.

9. The method of claim 1, wherein the at least one intent object comprises at least one of a user attribute, a demographic attribute, a goal attribute, a privacy attribute, a priority attribute, and a location attribute.

10. The method of claim 1, wherein the step of obtaining an environmental interaction representation includes obtaining data from a sensor.

11. The method of claim 10, wherein the sensor comprises at least one of a camera, a microphone, a thermometer, a global positioning system (GPS) sensor, a mechanical sensor, a chemical sensor, a biometric sensor, a hall effect sensor, an accelerometer, a pressure sensor, a compass, a magnetometer, a gas sensor, a speed sensor, a breathalyzer, an electrochemical sensor, a touch display, an optical sensor, a proximity sensor, a vibration sensor, a piezoelectric sensor, a capacitive sensor, a resistive sensor, a current sensor, a magnetometer, a voltage sensor, a liquid sensor, and a weight sensor.

12. The method of claim 1, wherein the step of obtaining an environmental interaction representation includes obtaining input from an interface.

13. The method of claim 12, wherein the interface comprises at least one of a touch screen, a keyboard, a controller, a joystick, a track ball, a mouse, a light pen, a graphic tablet, a barcode reader, a gamepad, a paddle, an electronic white board, a midi instrument, a video capture device, a remote, a wand, a stylus, a glove, a motion detector and a scanner.

14. The method of claim 1, wherein the intent object comprises a medical intent.

15. The method of claim 14, wherein the medical intent comprises at least one of a diagnosis intent, an appointment intent, a surgery intent, a prescription intent, a dosage intent, and a therapy intent.

16. The method of claim 1, wherein the intent object comprises an educational intent.

17. The method of claim 16, wherein the educational intent comprises at least one of a teaching intent, a syllabus intent, a curriculum intent, a learning objective intent, a conditioning intent, an assignment intent, an exam intent, an evaluation intent, a mentoring intent, a notetaking intent, a certification intent, a discipline intent, an instructional intent, a grading intent, and a lecturing intent.

18. The method of claim 1, wherein the intent object comprises a travel intent.

19. The method of claim 18, wherein the travel intent comprises at least one of a booking intent, a commission intent, a destination intent, a place of origin intent, a tour intent, a hospitality intent, a check-in intent, a route intent, a cargo intent, a luggage intent, a sightseeing intent, and a traffic intent.

20. The method of claim 1, wherein the intent object comprises a gaming intent.

21. The method of claim 20, wherein the gaming intent comprises at least one of an objective intent, a strategy intent, a bet intent, a wager intent, an instructions intent, a rules intent, a score intent, a survival intent, a demo intent, a role-playing intent, a stealth intent, and a tactical intent.

22. The method of claim 1, wherein the intent object comprises a shopping intent.

23. The method of claim 22, wherein the shopping intent comprises at least one of a purchase intent, a selling intent, a delivery intent, a spending intent, a budget intent, a barter intent, a trading intent, a return intent, an exchange intent, a bargaining intent, a discount intent, a sale intent, a clearance intent, a manufacturing intent, a retail intent, an inventory intent, an auction intent, a commission intent, a sales objective intent, a storage intent, a display intent, a social intent, a gift intent, a credit intent, and a transaction intent.

24. The method of claim 1, wherein the intent object comprises a health intent.

25. The method of claim 24, wherein the health intent comprises at least one of a fitness intent, a diet intent, a strength intent, a cardiovascular intent, an exercise intent, a running intent, a swimming intent, a stretching intent, a weight-loss intent, a weight-gain intent, a muscle growth intent, a bodybuilding intent, an agility intent, a quickness intent, a speed intent, a nutrition intent, a fat-loss intent, a hygiene intent, a cosmetic intent, an endurance intent, a blood pressure intent, an energy intent, a flexibility intent, a performance intent, a recovery intent, a relaxation intent, a therapeutic intent, a toning intent, a training intent, a stretching intent, a skills intent, a warm up intent and a workout intent.

26. The method of claim 1, wherein the intent object comprises an entertainment intent.

27. The method of claim 26, wherein the entertainment intent comprises at least one of an entertainment activity intent, a hobby intent, a holiday intent, a weekend intent, an anticipation intent, and a nightlife intent.

28. A system for controlling an electronic device to learn intents of a user and control output actions based on intents, the system comprising:

an intent database coupled with the electronic device and configured to store intent objects according to interaction attributes; and an intent management engine coupled with the electronic device and the intent database and configured to:

obtain an environmental interaction representation related to an environment of the electronic device, including obtaining data from two or more of the following sensors; a camera, a microphone, a thermometer, a global positioning system (GPS) sensor, a mechanical sensor, a chemical sensor, a biometric sensor, a hall effect sensor, an accelerometer, a pressure sensor, a compass, a magnetometer, a gas sensor, a speed sensor, a breathalyzer, an electrochemical sensor, a touch display, an optical sensor, a proximity sensor, a vibration sensor, a piezoelectric sensor, a capacitive sensor, a resistive sensor, a current sensor, a magnetometer, a voltage sensor, a liquid sensor, and a weight sensor, and forming the environmental interaction representation based on the obtained data;

derive interaction attributes within an interaction space as function of the environmental interaction representation;

modify at least one intent object from the intent database based on the interaction attributes, wherein the at least one intent object comprises a life time;

output, by the electronic device, a request for confirmation by the user of a user state of mind corresponding to the modified intent object;

receive input from the user indicating whether the user state of mind is confirmed;

use the user input to map a correlation between interaction attributes and the modified intent object; and configure an output device to adjust an output device action according to the at least one intent object.

29. The system of claim 28, wherein the intent management engine is configured to do at least one of instantiating, removing, deleting, activating, deactivating, classifying, archiving, exporting, forwarding, importing, receiving, tagging, duplicating, selecting and adding information to at least one intent object.

30. The system of claim 28, wherein the intent management engine is configured to adjust the expiration time of an intent object.

31. The system of claim 28, wherein the intent management engine is configured to adjust a relevancy attribute of an intent object with respect to the environmental interaction representation.

32. The system of claim 31, wherein the relevancy attribute is multi-valued.

33. The system of claim 32, wherein the relevancy attribute comprises multiple dimensions.

34. The system of claim 28, wherein the life time comprises a duration.

35. The system of claim 28, wherein the at least one intent object comprises at least one of a proposed future intent object, a past intent object, a current intent object, a suggested intent object, and a user selected intent object.

36. The system of claim 28, wherein the at least one intent object comprises at least one of a user attribute, a demographic attribute, a goal attribute, a privacy attribute, a priority attribute, a and a location attribute.

37. The system of claim 28, wherein the step of obtaining an environmental interaction representation includes obtaining data from a sensor.

38. The system of claim 37, wherein the sensor comprises at least one of a camera, a microphone, a thermometer, a global positioning system (GPS) sensor, a mechanical sensor, a chemical sensor, a biometric sensor, a hall effect sensor, an accelerometer, a pressure sensor, a compass, a magnetometer, a gas sensor, a speed sensor, a breathalyzer, an electrochemical sensor, a touch display, an optical sensor, a proximity sensor, a vibration sensor, a piezoelectric sensor, a capacitive sensor, a resistive sensor, a current sensor, a magnetometer, a voltage sensor, a liquid sensor, and a weight sensor.

39. The system of claim 28, wherein the interface comprises at least one of a touch screen, a keyboard, a controller, a joystick, a track ball, a mouse, a light pen, a graphic tablet, a barcode reader, a gamepad, a paddle, an electronic white board, a midi instrument, a video capture device, a remote, a wand, a stylus, a glove, a motion detector and a scanner.

* * * * *